US009145044B2

(12) United States Patent
Schulzki

(10) Patent No.: US 9,145,044 B2
(45) Date of Patent: Sep. 29, 2015

(54) ROOF ARRANGEMENT, AND METHOD FOR MOUNTING A ROOF ARRANGEMENT FOR A CABRIOLET VEHICLE

(71) Applicant: Dr. Ing. h.c. F. Porsche Aktiengesellschaft, Stuttgart (DE)

(72) Inventor: Markus Schulzki, Ludwigsburg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 126 days.

(21) Appl. No.: 13/951,589

(22) Filed: Jul. 26, 2013

(65) Prior Publication Data

US 2014/0035312 A1  Feb. 6, 2014

(30) Foreign Application Priority Data

Jul. 31, 2012  (DE) .......................... 10 2012 106 974

(51) Int. Cl.
| | | |
|---|---|---|
| *B60J 7/14* | (2006.01) | |
| *B60J 7/16* | (2006.01) | |
| *B60J 1/18* | (2006.01) | |
| *B60J 7/20* | (2006.01) | |

(52) U.S. Cl.
CPC *B60J 7/14* (2013.01); *B60J 1/1823* (2013.01); *B60J 7/1678* (2013.01); *B60J 7/205* (2013.01)

(58) Field of Classification Search
CPC ................ B60J 7/00; B60J 7/061; B60J 7/16; B60J 7/1628; B60J 7/1664; B60J 7/1692; B60J 1/1807; B60J 1/1823; B60J 7/14

USPC ............ 296/107.05, 107.07, 107.08, 107.09, 296/107.11, 107.15, 107.16, 107.17; 280/756

See application file for complete search history.

(56) References Cited

U.S. PATENT DOCUMENTS

| | | | | |
|---|---|---|---|---|
| 3,476,437 A | * | 11/1969 | Tomala et al. ................ 296/218 |
| 4,611,849 A | * | 9/1986 | Trenkler ....................... 296/201 |
| 7,740,302 B2 | * | 6/2010 | Heselhaus ..................... 296/116 |
| 2002/0105205 A1 | * | 8/2002 | Willard .................... 296/107.07 |
| 2004/0080178 A1 | * | 4/2004 | Klein et al. ............. 296/107.08 |
| 2006/0131919 A1 | * | 6/2006 | Brockhoff ............... 296/107.01 |
| 2008/0061542 A1 | * | 3/2008 | Froschle et al. ............. 280/756 |

FOREIGN PATENT DOCUMENTS

| | | | | |
|---|---|---|---|---|
| EP | 454279 A2 | * | 10/1991 | ................ B60J 7/08 |
| EP | 0 845 378 | | 6/1998 | |

* cited by examiner

*Primary Examiner* — Jason S Morrow
*Assistant Examiner* — E Turner Hicks
(74) *Attorney, Agent, or Firm* — Gerald E. Hespos

(57) ABSTRACT

A roof arrangement for a cabriolet vehicle has a rear window arrangement (10) with a rear (15) that surrounds a front edge (14A) of the rear window (14), a lower frame element (16) that surrounds a lower edge (14B) of the rear window (14), and connecting elements (18) that connect respective ends (15A, 15B, 16A, 16B) of the front and the lower frame element (15, 16). The roof arrangement also has a lower roof element (20) that is connected to the rear window arrangement (10) and can be moved between open and closed positions.

13 Claims, 1 Drawing Sheet

ROOF ARRANGEMENT, AND METHOD FOR MOUNTING A ROOF ARRANGEMENT FOR A CABRIOLET VEHICLE

CROSS REFERENCE TO RELATED APPLICATION

This application claims priority under 35 USC 119 to German Patent Appl. No. 10 2012 106 974.3 filed on Jul. 31, 2012, the entire disclosure of which is incorporated herein by reference.

BACKGROUND

1. Field of the Invention. The invention relates to a roof arrangement and to a method for mounting a roof arrangement for a cabriolet vehicle.

2. Description of the Related Art. EP 0 845 378 A1 discloses a cabriolet vehicle with a roof structure that has front and rear roof elements. The front roof element extends between a windshield frame and a roll bar, and the rear roof element adjoins the roll bar. The rear roof element comprises a rear window with a border frame that surrounds an upper transverse edge and two lateral edges of the rear window. The border frame is drawn to the front sufficiently at the upper transverse edge of the rear window to close the upper transverse section of the roll bar completely when the rear roof element is closed. A folding top compartment lid is connected to the lower edge of the border frame of the rear window. The folding top compartment lid is configured so that two side limbs of the folding top compartment lid are drawn further to the front than the lower end regions of the border frame. The border frame, the rear window, the folding top compartment lid and an inner parcel shelf form a prefabricated structural unit.

A roof structure of the type described above has a plurality of links arranged on respective folding top bearings to displace the respective roof elements. Moreover, the rear roof element is configured so that in the closed state the border frame completely covers the upper transverse section of the roll bar for stability reasons.

It is an object of the invention to provide an improved roof arrangement and an improved method for mounting a roof arrangement for a cabriolet vehicle to improve stability and to simplify mounting of the roof arrangement.

SUMMARY OF THE INVENTION

The invention relates to a cabriolet vehicle with a roof arrangement that can be moved between a closed position and an open position. The roof arrangement comprises a rear window arrangement that has a rear window with an enclosing frame, a front frame element that surrounds a front edge of the rear window, a lower frame element that surrounds a lower edge of the rear window, and connecting elements that connect respective ends of the front and the lower frame elements. The roof arrangement also comprises a lower roof element that is connected to the rear window arrangement.

The above-described rear window arrangement ensures that the rear window is supported by the enclosing frame. The enclosing frame absorbs forces that act on the rear window arrangement, for example during driving of the vehicle, with a force distribution taking place to the front and lower frame elements. The rear window arrangement is connected to the lower roof element, which can be moved between a closed position and an open position, the roof arrangement is configured in one piece and can be moved as a single-piece element from the closed position into the open position and vice versa.

The rear window arrangement can be premounted independently of the lower roof element and can subsequently be connected to the lower roof element.

The front frame element preferably is an extruded profile to ensure great strength for the front frame element and improved roof stability. Moreover, despite great material strength, the extruded profile can be made into a desired shape of the front edge of the rear window.

The lower frame element preferably has a plurality of frame segments arranged adjacent to one another in the longitudinal direction. Connecting points between respective frame segments may be welded or riveted. The lower frame element surrounds the lower edge of the rear window. The lower frame element therefore has a considerable length due to the dimensions of the rear window. Configuring the lower frame element as frame segments arranged adjacent to one another in the longitudinal direction simplifies production and improves strength of the lower frame element.

Each connecting element may be configured as a cast node, and preferably as a cast aluminum part. As a result, each connecting element has a low weight and serves as reinforcing element of the front and lower frame elements.

Each connecting element may be adhesively bonded, screwed or welded to respective ends of the front and the lower frame elements. The type of connection can be selected according to the material used for the front and lower frame elements.

The lower roof element is connected to the lower frame element of the rear window arrangement. The connection of the lower roof element to the lower frame element is preferably a screwed connection. As a result, simple and reliable mounting of the rear window arrangement and the lower roof element can be achieved.

The lower roof element preferably has inner and outer plates, with the lower frame element of the rear window arrangement being connected to the outer plate of the lower roof element. The configuration of the lower roof element with inner and outer plates contributes to improved material strength with low weight of the lower roof element due to the low sheet metal thickness.

The front and lower frame element preferably are made from metal or plastic. The selection of the material of the lower frame element can follow corresponding considerations with regard to weight, material strength, connecting properties or the like.

The roof arrangement preferably adjoins a roll bar in the closed position, and a seal on the front frame element engages the roll bar. The seal ensures reliable sealing of the roof arrangement with respect to the roll bar and the body of the vehicle.

A storage box preferably is arranged under the lower roof element and receives a front roof element in the open position of the roof. The single-piece configuration of the roof arrangement and the pivotability of the one-piece roof arrangement enables the rear window arrangement to have any desired shape, without special spatial requirements of the front roof element and the storage box which is under the lower roof element.

The lower roof element can be moved from the closed position into the open position by an actuating element. As a result, automatic opening and closing of the one-piece roof arrangement can be achieved.

The rear window preferably is bonded adhesively to the enclosing frame. The attachment of the front frame element to a front edge of the rear window and the attachment of the lower frame element to a lower edge of the rear window achieves optimum bearing surfaces of the rear window on the frame element and enables simple and precise adhesive bonding of the rear window to the enclosing frame.

The invention also relates to a method for mounting a roof arrangement for a cabriolet vehicle. The roof arrangement can be moved from a closed position into an open position. The method comprises mounting a rear window arrangement by connection of a rear window to a front frame element which surrounds the front edge of the rear window and to a lower frame element which surrounds the lower edge of the rear window. The method also includes connecting respective ends of the front and the lower frame element by connecting elements. The method further comprises connecting of a lower roof element to the rear window arrangement.

As a result, the rear window arrangement can be premounted independently of the lower roof element and can subsequently be connected to the lower roof element. This simplifies the mounting during the final mounting of the roof arrangement.

Moreover, the invention provides a cabriolet vehicle having the above-described roof arrangement.

Exemplary embodiments of the invention are shown in the figures and are explained in greater detail in the following description.

DETAILED DESCRIPTION OF THE PREFERRED EMBODIMENTS

Figure 1:
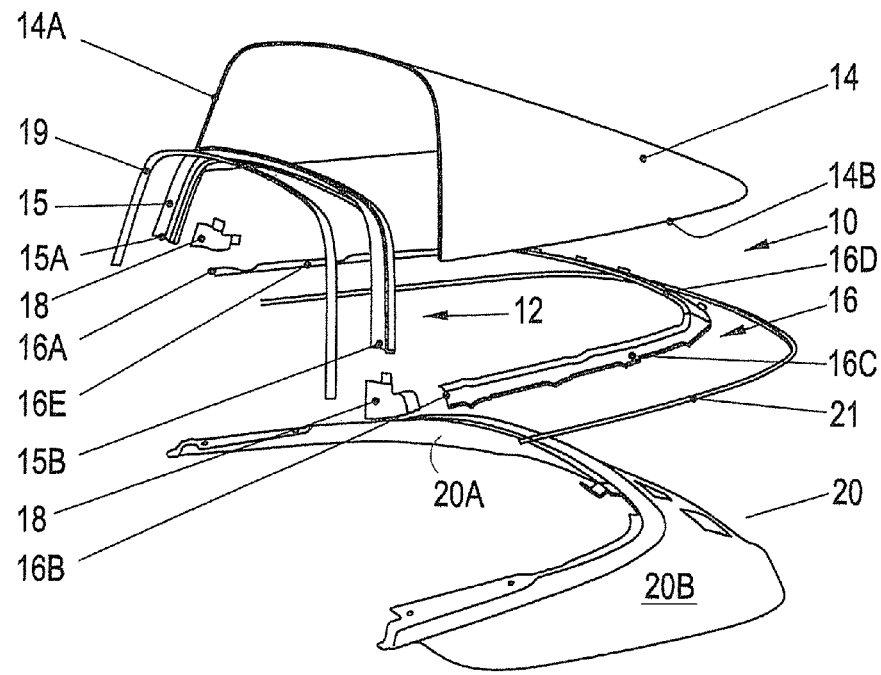
FIG. 1 shows an exploded illustration of a roof arrangement for a cabriolet vehicle according to one preferred exemplary embodiment.

FIG. 1 shows an exploded illustration of a roof arrangement for a cabriolet vehicle. The roof arrangement has a rear window arrangement 10 that includes an enclosing frame 12 and a rear window 14. The enclosing frame 12 is configured to correspond to the shape of the rear window 14. More particularly, the enclosing frame 12 has a front frame element 15, a lower frame element 16 and connecting elements 18 that connect two respective ends 15A, 15B, 16A, 16B of the front and the lower frame elements 15, 16. The lower frame element 16 has a plurality of frame segments 16C, 16D, 16E that are arranged adjacent to one another in the longitudinal direction and are connected to one another in a suitable way. The connecting points between respective frame segments 16C, 16D, 16E can be welded or riveted, for example.

The front frame element 15 surrounds a front edge 14A of the rear window 14 and the lower frame element 16 surrounds a lower edge 14B of the rear window 14.

The enclosing frame 12 is bonded adhesively to the rear window 14. The front and the lower frame element 15, 16 preferably are made metal, but can be made of plastic. The connecting elements 18 can be configured as a cast node, and preferably as a cast aluminum part. The connection between the frame elements 15, 16 and the connecting element 18 at respective ends 15A, 15B, 16A, 16B of the front and the lower frame element 15, 16 is preferably a welded connection. As an alternative, an adhesively bonded or screwed connection can be provided, for example, if the front and the lower frame element 15, 16 are made of plastic.

The front frame element 15 is provided with a seal 19. In a closed position, the roof arrangement adjoins a roll bar RB, and the seal 19 seals the roof arrangement with respect to the roll bar RB.

A trim strip 21 is arranged on the lower frame element 16. Furthermore, the roof arrangement has a lower roof element 20 which can be moved from a closed position into an open position by means of an actuating element (not shown) and which can be connected to the rear window arrangement 10.

The premounted rear window arrangement 10 preferably is screwed to the lower roof element 20. In particular, the lower roof element 20 is screwed to the lower frame element 16 of the rear window arrangement 10. The lower roof element 20 preferably has inner and outer plates 20A, 20B, and the rear window arrangement 10 is connected to the outer plate 20B of the lower roof element 20.

The roof arrangement comprises the rear window arrangement 10 and the lower roof element 20 and forms a folding top compartment roof of a higher roof arrangement for the cabriolet vehicle. The higher roof arrangement is not shown in the figures for the sake of simplicity has, but has at least one front roof element between a windshield frame and the roll bar in the closed position of the roof arrangement. A storage box 20C is arranged under the lower roof element 20.

Figure 2:
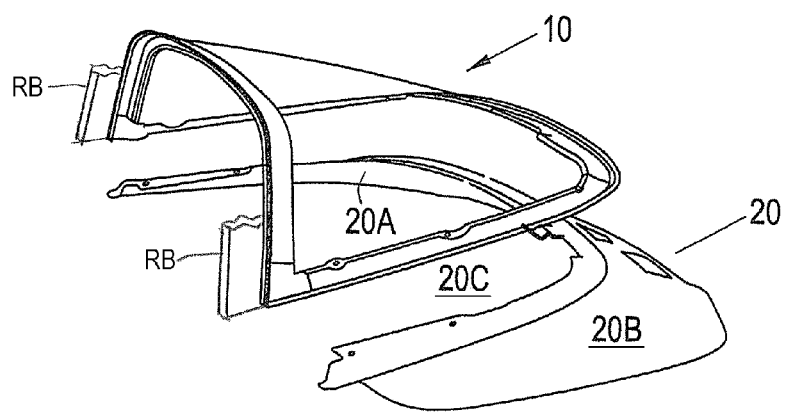
FIG. 2 shows a diagrammatic illustration of the roof arrangement for a cabriolet vehicle in the premounted state according to one preferred exemplary embodiment.

FIG. 2 shows a diagrammatic illustration of the roof arrangement for the cabriolet vehicle in the premounted state. Here, the rear window arrangement 10 already is premounted and then merely has to be connected to the lower roof element 20. The connection between the lower roof element 20 and the lower frame element 16 of the rear window arrangement 10 preferably is a screwed connection, with the rear window arrangement 10 and the lower roof element 20 having corresponding holes for the provision of fastening screws.

The invention is not restricted to the above exemplary embodiment. In the context of the scope of protection, the roof arrangement according to the invention and/or the method according to the invention for mounting the roof arrangement can rather also assume a different embodiment than that described in concrete terms above.

The shape of the enclosing frame 12 of the rear window 14 can be configured, for example, so as to correspond to any desired shape of the rear window 14.

What is claimed is:

1. A roof arrangement for a cabriolet vehicle, the roof arrangement being movable from a closed position into an open position, comprising:
    a rear window arrangement with a non-planar rear window having a front edge defining a downwardly concave U-shape and a lower edge defining a forwardly concave U-shape, the front edge and the lower edge meeting at a lower front corners and an enclosing frame, the enclosing frame including a front frame element that surrounds and fixedly engages the front edge of the rear window, a lower frame element that surrounds and fixedly engages the lower edge of the rear window, and connecting elements that connect respective ends of the front and the lower frame elements at the lower front corners of the rear window; and
    a lower roof element connected to the lower frame element of the rear window arrangement.

2. The roof arrangement of claim 1, wherein the front frame element is an extruded profile formed to define a U-shape conforming to the front edge of the rear window.

3. The roof arrangement of claim 1, wherein the lower frame element has a plurality of frame segments arranged adjacent to one another in a longitudinal direction, connecting points between respective frame segments being welded or riveted.

4. The roof arrangement of claim 1, wherein the connecting elements are cast parts.

5. The roof arrangement of claim 4, wherein the connecting elements are bonded adhesively, screwed or welded to respective ends of the front and the lower frame elements.

6. The roof arrangement of claim 1, wherein the lower roof element and the lower frame element of the rear window arrangement have a screwed connection.

7. The roof arrangement of claim 1, wherein the lower roof element has inner and outer plates, the lower frame element of the rear window arrangement being connected to the outer plate of the lower roof element.

8. The roof arrangement of claim 1, wherein the front and lower frame elements are made from metal or plastic.

9. The roof arrangement of claim 1, wherein the roof arrangement, in the closed position, adjoins a roll bar that is fixed to the vehicle, the roof arrangement further comprising a seal arranged on the front frame element for sealing with respect to the roll bar in the closed position.

10. The roof arrangement of claim 1, further comprising a storage box under the lower roof element for receiving a portion of the roof arrangement in an open position.

11. The roof arrangement of claim 1, wherein the rear window is adhesively bonded to the enclosing frame.

12. A method for mounting a roof arrangement for a cabriolet vehicle, comprising:

providing a non-planer rear window with a front edge defining a downwardly concave U-shape and a lower edge defining a forwardly concave U-shape, the front edge and the lower edge meeting at lower corners;

connecting the front edge of the rear window to a U-shape extruded metal front frame element that surrounds and engages the front edge of the rear window and to a U-shaped lower frame element that surrounds and engages the lower edge of the rear window, and connecting respective ends of the front and lower frame elements by connecting elements to form a rear window arrangement; and connecting the lower frame element of the rear window arrangement to a lower roof element that can be moved from a closed position into an open position.

13. A cabriolet vehicle having the roof arrangement of claim 1.

* * * * *